US007001575B2

(12) United States Patent
Cwik et al.

(10) Patent No.: US 7,001,575 B2
(45) Date of Patent: Feb. 21, 2006

(54) DEVICE FOR FEEDING EDUCTS TO PARALLEL SPACES

(75) Inventors: Roland Cwik, Augsburg (DE);
Andreas Ebert, Kirchheim (DE);
Oskar Lamla, Kirchheim-Nabern (DE);
Bruno Motzet, Weilheim/Teck (DE);
Martin Schuessler, Ulm (DE); Tomas Stefanovski, Boeblingen (DE); Alois Tischler, Dorfen (DE); Marc Weisser, Owen/T. (DE)

(73) Assignee: NuCellSys GmbH, Kirchheim/Teck-Nabern (DE)

( * ) Notice: Subject to any disclaimer, the term of this patent is extended or adjusted under 35 U.S.C. 154(b) by 682 days.

(21) Appl. No.: 09/927,909

(22) Filed: Aug. 13, 2001

(65) Prior Publication Data
US 2002/0041839 A1 Apr. 11, 2002

(30) Foreign Application Priority Data
Aug. 12, 2000 (DE) .................. 100 39 592

(51) Int. Cl.
B01J 8/02 (2006.01)
B01D 1/00 (2006.01)

(52) U.S. Cl. .................... 422/220; 159/17.2; 159/43.1

(58) Field of Classification Search ................ 422/220, 422/221, 224, 191; 159/43.1, 28.6, 44, 17.2, 159/DIG. 8, DIG. 28
See application file for complete search history.

(56) References Cited

U.S. PATENT DOCUMENTS

| 4,371,034 A | * | 2/1983 | Yamada et al. ............. 165/108 |
| 4,785,875 A | * | 11/1988 | Meijer et al. ........... 165/104.25 |
| 5,423,952 A | * | 6/1995 | Stout .......................... 202/174 |
| 5,800,673 A | * | 9/1998 | Okuda et al. .............. 159/28.6 |
| 5,904,807 A | * | 5/1999 | Ramm-Schmidt et al. . 159/43.1 |
| 6,068,730 A | * | 5/2000 | Ramm-Schmidt et al. . 159/43.1 |
| 6,447,941 B1 | * | 9/2002 | Tomimatsu et al. ........... 429/26 |

FOREIGN PATENT DOCUMENTS

| DE | 19720294 | 11/1998 |
| DE | 19904398 | 8/2000 |
| EP | 0849375 | 11/1997 |
| EP | 0878442 | 11/1998 |
| JP | 04121707 | 5/1992 |
| JP | 04363509 | 12/1992 |

OTHER PUBLICATIONS

"Ullmann's Encyclopedia of Technical Chemistry Tape" Publishing House Chemistry, Weinheim, 1976.
Copy of the Search Report.

* cited by examiner

Primary Examiner—Kevin P. Kerns
(74) Attorney, Agent, or Firm—Crowell & Moring LLP

(57) ABSTRACT

A device feeds educts to parallel spaces separated from one another by way of a distributor unit. Outlets of the distributor unit are assigned to the spaces, and evaporator structures for the evaporation of liquid media are provided in the spaces. Each outlet of the distributor unit project into a space. The boiling point of the medium in the distributor unit is maintained above the temperature of the medium in the distributor unit.

18 Claims, 4 Drawing Sheets

DEVICE FOR FEEDING EDUCTS TO PARALLEL SPACES

This application claims the priority of German Patent Document, 100 39 592.9 filed Aug. 12, 2000, the disclosure of which is expressly incorporated by reference herein.

The present invention relates to a device for feeding educts to parallel spaces separated from one another comprising a distributor unit, an outlet arrangement of the distributor unit operatively assigned to the parallel spaces, and evaporator structures for the evaporation of liquid media provided in the spaces.

Modularly constructed so-called stack reactors consisting of a plurality of successively arranged catalyst discs are in ever increasing use because of their compactness and their design which can be adapted in a simple way to any reaction taking place by solid-state catalysis. An especially important field of use is, in this context, fuel cells which can be used, in particular, in motor vehicles.

In motor vehicle use, hydrogen is obtained from a mixture of a hydrocarbon, which in this field conventionally also includes alcohols, aldehydes, ketones and the like, and water. This reaction is designated, in general, as hydrocarbon reforming [Ullmann's Encyclopaedia of Industrial Chemistry], Volume 12, pages 113–136, Verlag Chemie, Weinheim 1976), The mixture, preferably present in the vapor phase of the hydrocarbon, in particular methanol, and water is converted on the surface of a corresponding solid-state catalyst which usually contains copper.

DE 197 20 294 Cl discloses a reforming reactor, in which the educt mixture is evaporated in the evaporation zone via feeder plates coupled thermally to the evaporation zone and is subsequently fed to the reaction zone. The feeder plates have duct structures that are not defined in any more detail.

DE 199 04 398.1 discloses a more generic device in which the educt mixture is fed to individual catalyst layers (modules) in a duct via a lance provided, for example, with nozzles and designed as a double tube. The outer tube of the lance is in fixed thermally conductive connection with the reactor or with the catalysis layers.

Both the reactor types mentioned above have the disadvantages that the educt distribution systems, feeder plate or lance that are used there can lead to unequal distributions of the educt mixture to the individual modules of the stack reactor and also cannot compensate pressure fluctuations within the distribution system. Moreover, in the known distribution systems, pronounced pressure fluctuations occur due to only partial or regional evaporation of the educt mixture, thus leading to pulsations in the distribution system and ultimately to unequal distributions to the modules. The result of this is that, during a catalytic reaction, some reactor regions are loaded excessively and others, in turn, insufficiently, whereby desirable thermal gradients occur within the reactor. Overall the efficiency and reaction rate of a reaction taking place in this way by solid state catalysis are thereby impaired.

SUMMARY OF THE INVENTION

An object of the present invention is therefore, to provide a device provides for uniform distribution of the educt or educts to the individual modules, while avoiding pulsation in the distribution system.

This object has been achieved by a device characterized in that in each case an outlet means of the distributor unit projects into a space, and, at each point of the distributor unit, the boiling point $T_s$, of the medium is above the temperature of the medium in the distributor unit. Accordingly, in each case an outlet of the distributor unit projects into space, and the boiling point of the medium in the distributor unit is above the temperature of the medium in the distributor unit.

Preferably, the flow resistance in the region of tile outlet is so high that the boiling point of the medium in the outlet is higher than the boiling point of the medium in the associated space.

Also preferably, the distributor unit is thermally uncoupled in relation to the spaces, at least in the region of the outlet. Preferably the outlet or the last distributor stage in the distributor unit have a higher flow resistance to throughflowing educt in relation to the preceding region or regions of the distributor device.

Preferably, the higher flow resistance is generated by effecting a pressure loss which is maintained even when pressure is applied from outside. This is achieved by fittings, such as closepacked narrow capillaries ducts or sintered materials with adjustable porosity or meandering structures where flow resistance is adapted to the respective distribution system and to a device supplied by it, such as a reactor or evaporator.

The thermal insulation of the distribution system from the device is preferably achieved in that thermal nonconductors or things with low thermal conduction are arranged around the distribution system. Examples include vacuum chambers, gas or thermally low-conducting ceramics. These form a casing which prevents the reaction heat of the device from being transmitted to the distribution system that will give rise to the harmful effects mentioned above.

In a further currently preferred embodiment for thermal insulation, the distribution system and evaporator structures are arranged, spaced from one another, in the spaces. The possibility that gas, known to be a poor heat conductor, can be used for insulating the distribution system that consequently be surprisingly utilized in a simple and efficient way.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
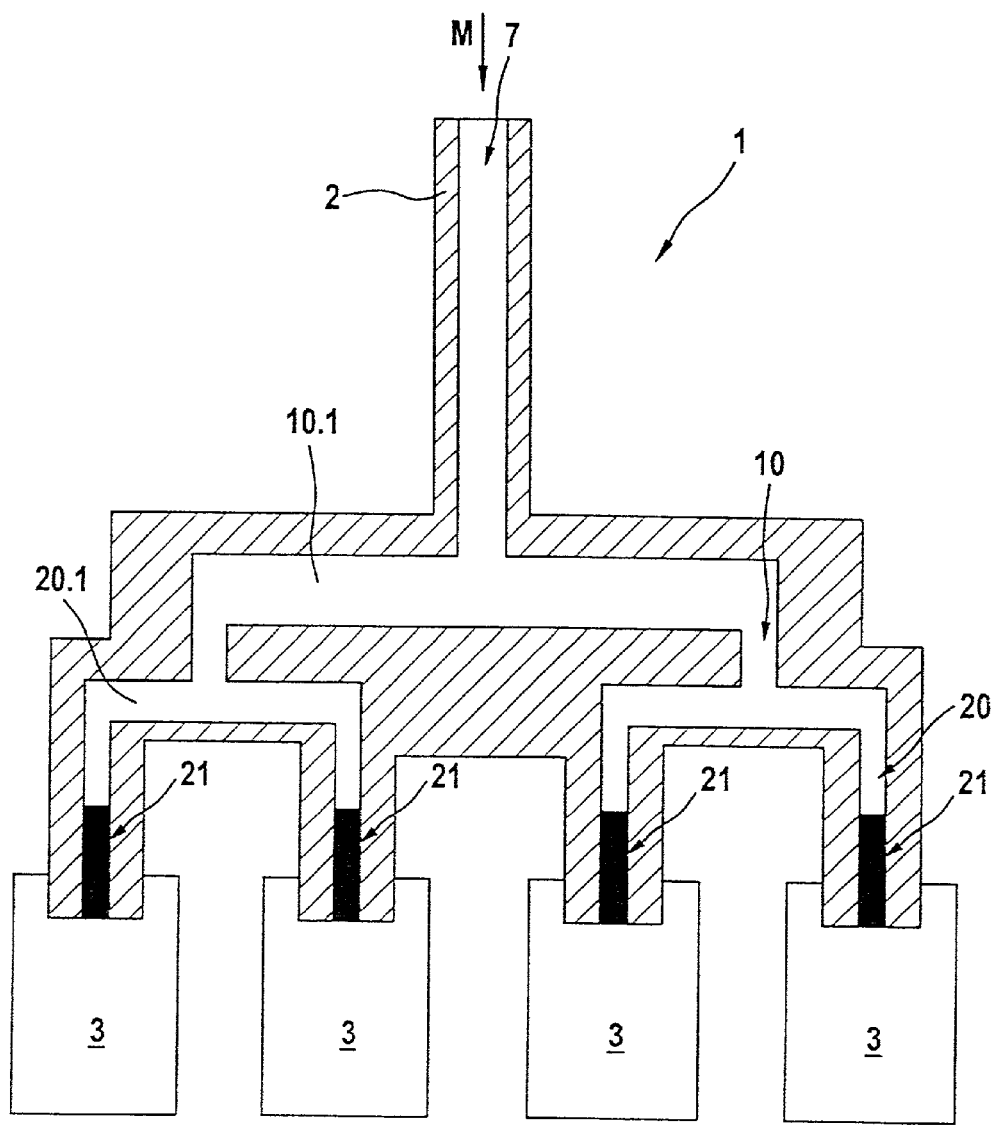
FIG. 1 is a schematic elevational view of an exemplary device in the form according to the invention.

FIG. 1 shows a device according to the invention in the form of a reactor. The device 1 is provided for feeding media M to parallel spaces 3 separated from one another. A distributor unit 2 feeds a medium M, for example an educt or an educt mixture, in liquid form to the spaces 3, and the medium is evaporated in the spaces 3 by evaporator structures. The evaporator structures for evaporating the liquid medium may be formed, for example, by the boundary walls of the spaces 3 or else by nets or similar surfaces. The evaporator structures may also be coated catalytically. The evaporated medium can then be conducted from the evaporator structure to a reaction region.

The distributor unit 2 is composed of a feed device 7, 10, 20 for feeding the medium to the spaces 3 and outlet 21, from which the medium M passes from the distributor unit 2 into the spaces 3. In this case, the distributor unit 2 has a common feed unit 7 through which the medium M passes into the distributor unit 2. In the illustrated distributor unit 2, for example, two distributor stages 10, 20 are shown, via which the flow path of the medium M is branched. In the first distributor stage 10, the flow path is divided into two portions and in the second distributor stage 20 the flow path is divided into altogether four portions. The medium M is distributed specifically into the individual spaces 3 via the last distributor stage 20.

In each stage an outlet 21 of the distributor unit 2 is assigned to a single space 3. Each outlet 21 projects to the associated space 3. The medium M can thus be metered specifically into the respectively associated space 3. In this case, the boiling point $T_s$ of the medium M in the distributor unit 2 is above the temperature of the medium in the distributor unit 2. This ensures that the medium cannot evaporate in the distributor unit 2. This can be brought about by various measures and techniques that can be applied individually or else in combination with one another.

Preferably, the distributor unit 2 is configured in such a way that the flow resistance or pressure loss in the distributor unit 2 varies as a function of a temperature profile along the distributor unit 2. Beneficially, the distributor unit 2 is designed so that the flow resistance or pressure loss in the distributor unit 2 rises in proportion to the temperature of the distributor unit 2. The boiling point $T_s$ of the medium M is then highest at the hottest point of the distributor unit 2, thus ensuring that no medium M can evaporate within the distributor unit 2.

Preferably, at least the last distributor stage 20 has a high flow resistance which leads to a sufficiently high pressure drop in the outlet 21, so that the boiling point $T_s$ of the medium M in the respective outlet 21 is higher than the ambient temperature of the outlet 21 in the respective space 3 or the temperature of the medium M in the outlet 21. Thus, for example, the boiling point of methanol at a pressure of 5 bar is considerably above the boiling point at normal pressure. If the outlet 21 has a pressure loss of 5 bar, the boiling point is much higher than the boiling point in the associated space 3.

Expediently, the outlets 21 of the distributor unit 2 are thermally uncoupled at least in relation to the spaces 3, with the entire distributor device 2 preferably being thermally uncoupled in relation to the spaces 3. In a preferred version, each outlet 21 can be formed by a metering tip, a capillary or the like which projects via an evaporator structure, for example the hot boundary wall into the space 3 and is spaced from this evaporator structure. There is no connection causing solid-state thermal conduction between the outlet 21 and the space 3 or the evaporator structure of the space 3. The medium is injected into the space 3, evaporates on the boundary wall of the space and is transported further on as vapor. The outlets 21 are advantageously configured essentially identically.

The particular advantage is that a good equal distribution of the educts or educt mixture in the individual spaces 3 is achieved in this way. The thermal uncoupling of the distributor device 2 or of the outlet 21 in relation to the spaces 3 prevents the medium M from being heated and evaporated as early as in the distributor device and vapor formation from then leading to undesirable pulsations which could disturb the equal distribution of the educts. A highly accurate metering of the medium M is consequently possible, so that the processes in the spaces 3 can take place in a highly homogeneous manner. This is particularly advantageous in evaporators or reactors which have a plate shape or a tube-bundle shape, and which are employed in systems in which as homogeneous operating conditions as possible are desired, for example in fuel-cell systems.

More than two distributor stages 10, 20 can also be provided in the device, but at least one distributor stage 10 is provided. Preferably, the flow resistance of the last distributor stage 10 having the outlets 21 is higher at least by a factor of ten than the flow resistance in the media flow path of the preceding distributor stages 10 having the common feed 7. Thus, for example, the flow resistance of the last distributor stage 20 having the outlet 21 is higher by at least a factor of 3, preferably a factor of 10, than the flow resistance of the medium M in the media flow path which is composed of the portions 7, 10.1, 20.1.

Preferably, the flow resistance between different outlets 21 of the distributor unit 2 deviates by at most 20%, preferably at most 5%, from an average value of the flow resistance of the last distributor stage having the outlets 21. This ensures a good equal distribution of the medium into the various spaces 3. To generate the higher flow resistance, structure for bringing about a pressure loss is expediently provided, the structure including things such as capillaries, duct structures and sintered porous materials.

In addition to the possibility of thermally uncoupling the distributor device 2, preferably at least the outlets 21, by these not being connected to the walls of the reactor or evaporator so as to cause solid-state conduction, thermal uncoupling can be effected by arranging thermally non-conductive or insulators at least regionally around the distributor device 2. It is also possible to provide cooling devices.

A higher flow resistance of the last distributor stage 20 in relation to the flow resistance upstream of the last distributor stage 20 has the effect that different flow resistance of the preceding distributor stages 10 and/or feeds 7, such as often occur when the sizes of the feed portions are different from one another or else are caused by manufacturing tolerances, can be ignored. An approximately equal quantity of liquid M therefore passes into each space 3.

The thermal uncoupling of the distributor unit 2, at least in the region of the outlets 21, ensures that the thermal energy released from the evaporation of the educts in the evaporation zone cannot be utilized for the regional or even complete evaporation of the educt or educts in the distributor device 2. As a result, pressure pulses and/or excessive pressure increases due to educt evaporation in the distributor device 2 can be avoided in a simple way. Preferably, the entire distributor unit 2 is uncoupled thermally from the device.

Figure 2:
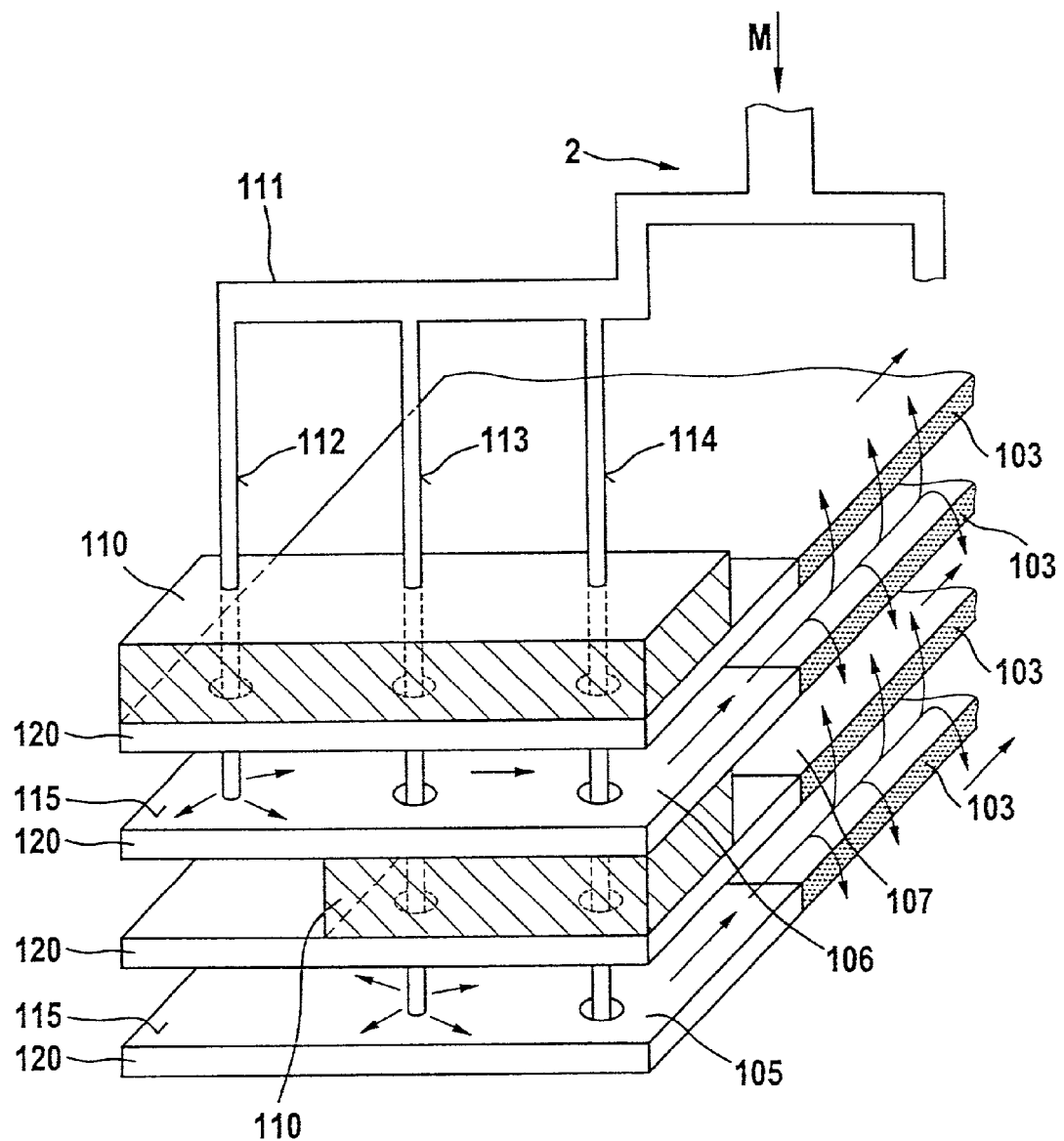
FIG. 2 is a perspective view of a detail of a currently preferred reactor according to the present invention.

In a currently preferred version, the device 1 is used as a stack reactor, which integrates an evaporator carries out a reaction by solid-state catalysis with successively arranged catalyst discs. FIG. 2 is a more detailed new of a preferred stack reactor of this type, which illustrates the reactor principles. The reactor has a number of surfaces 120 stacked one on the other. The surfaces 120 are spaced from one another and form spaces. Wall boundaries are not illustrated for the sake of clarity. The surfaces 120 are perforated and stacked one above the other so as to form mutually aligned ducts, into which outlets 112, 113, 114 of the last distributor stage 111 of the distributor unit 2 project. The outlets 112, 113, 114 are thin tubes that are spaced from the reactor walls.

The outlets 112, 113, 114 terminate in different spaces of the reactor, of which two spaces 105, 106 are illustrated by way of example.

An evaporation zone 115 is provided in each regions around the outlets 112, 113, 114 in or on the surfaces 120. Liquid emerging from the outlets is evaporated completely there. The evaporation zones 115 are followed contiguously by a reaction zone with catalyst discs 103 that are permeable to the evaporated medium, the medium being converted catalytically there. The medium flowing through the catalyst discs 103 is conducted away from the reactor zone in a collecting duct 107 as indicated by arrows. A seal 110 provided between those two surfaces 120 which delimit the collecting duct 107 and/or other comparable collecting ducts to prevent evaporated medium from passing through the duct into the collecting duct 107 or the collecting ducts, instead of through the catalyst disc 103 into the collecting duct.

The evaporation region 115 can be constructed differently, depending on the type of reactor. The selection of the evaporator depends, however, on the reaction to be carried out and the reactor design and, within the scope of the present invention, is therefore according to choice. The currently preferred stack reactor is used, for example, as an autothermal reforming reactor for obtaining hydrogen from hydrocarbons and water, for example in mobile fuel-cell systems, in which a fuel, such as, for example, methanol or other alcohols, ether or hydrocarbons, has to be evaporated with high metering accuracy.

Another embodiment of the preferred stack reactor (not shown) is related, for example, to the type described in EP 0 906 890 Al, but where one or more outlets, as a distributor system appropriately configured according to the invention, lead to each catalyst disc.

In a further currently preferred version, the device according to FIG. 2 is used as evaporator. In this version, no reaction zones with catalyst discs 103 are provided contiguously to the evaporation zones 115, but, instead, the vapor is conducted away from the evaporator via one or more collecting ducts 107. In this case, there is also no need for a sealing-off measure, such as with sealing-off structure 110, but, instead, use may advantageously be made of the fact that a compensation of the steam quantities in the individual spaces 105, 106 can take place via the perforations in the surfaces 120 around the outlets 112, 113, 114.

The device according to the invention can also be employed preferably in gas-heated countercurrent evaporators. A further preferred field of use is reactors in which a reaction is carried out with a large increase in volume or in molar weight due to products which occur. The spaces 3, 105, 106 of the device can also be formed by plates, discs or tubes, and, if there is a plurality of plates, discs or tubes, in each case one outlet 21 or 112, 113, 114 is assigned to a space 3 or 105, 106 into which the latter projects.

Figure 3:
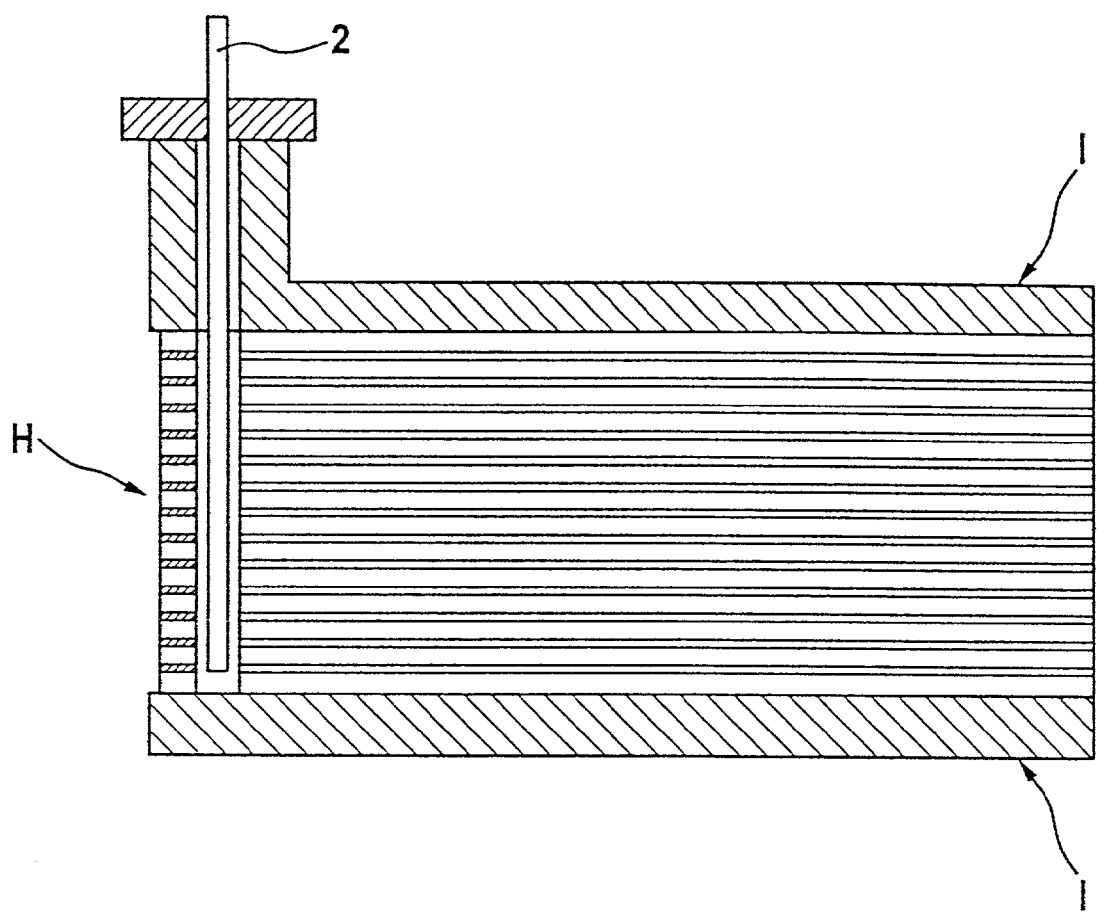
FIG. 3 is a cross-sectional view of a currently preferred reactor of the type shown in FIG. 2.

FIG. 3 schematically illustrates the currently view of the preferred reactor or evaporator of FIG. 2. The reactor with surfaces 120, spaces 105, 106 and an evaporation zone and/or reaction zone with catalyst discs 103 is arranged as a whole in a zone H. The zone H is closed off relative to the atmosphere by insulating plates I which insulate the reactor or the evaporator relative to the environment. The distributor device 2 is led through one of these insulating discs I and is screwed to the housing in a gastight manner. The various distributor stages of the distributor unit can be arranged both inside and outside the insulating discs I.

It is also beneficial for the device of the present invention to be used as in evaporators.

Figure 4:
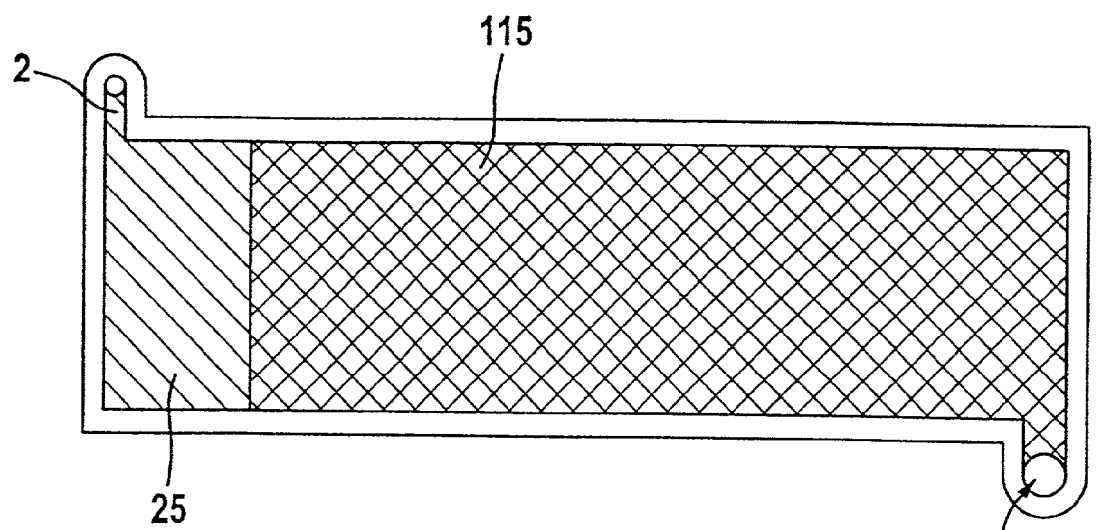
FIG. 4 is a plan view of a detail of a preferred evaporator according to the present invention.
Figure 5:
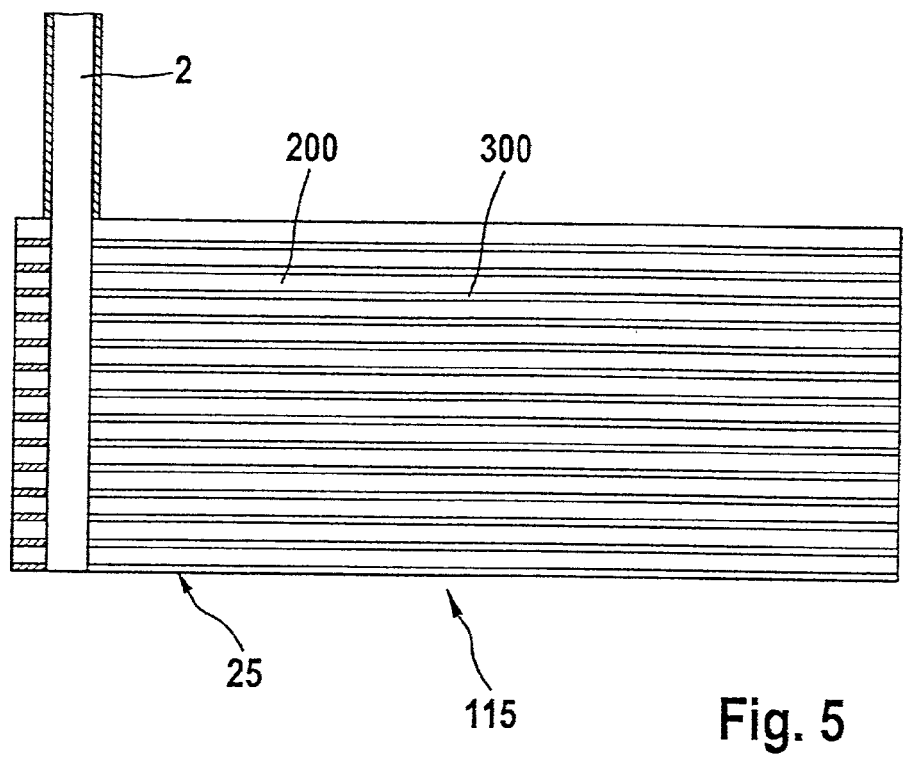
FIG. 5 is a partial, cross-sectional side view of the evaporator shown in FIG. 4.

FIG. 4 and FIG. 5 are viewed a currently preferred evaporator. This can be a media-heated countercurrent evaporator or a cocurrent evaporator.

FIG. 4 is a top view of a space 200 of a preferred gas-heated countercurrent evaporator. The distributor unit 2 terminates with its penultimate distributor stage at the entrance to the outlet arrangement 25 of the space 200. This may be, in particular a meandering-like duct structure in a plate of the plate evaporator. The medium M passes into this duct structure of the outlet arrangement 25. The flow resistance and the associated pressure loss are very high so that the boiling point of the medium is increased sharply. The medium M passes in liquid form into the evaporator region, 115 which has a lower flow resistance and is evaporated there. The vapor then passes into the collector structure 30 and is led away from there out of the evaporator.

Contiguously to the space 200, a further duct 300, in which the heating medium flows, is provided parallel to space 200. In a currently preferred countercurrent evaporator, the heating medium, for example a fuel gas or oil or the like, is hottest in the region of the collector structure 30 and cools in the direction of the outlet arrangement 25. It is advantageous if the conditions of the ducts 200, 300 are coordinated with one another such that the temperature of the heating medium in the region of the evaporation zone 115 corresponds to the boiling temperature of the medium M in this zone and then falls below this temperature at the latest at the transition to the outlet arrangement 25 downstream. Although the temperature of the heating medium is then still relatively high, the energy content is no longer sufficient to evaporate the medium M, especially since the latter still has a higher boiling point in the outlet arrangement 25 than in the region of the evaporation zone 115.

FIG. 5 the plate form of construction of the preferred evaporator. The medium M is fed to the outlet arrangement 25 by the distributor unit 2. The liquid medium M passes out of the region of the outlet arrangement 25 into the evaporation region 115 and is evaporated there. Spaces 200, in which the medium M is evaporated, alternate in this case with spaces 300 in which the heating medium is carried.

It is advantageous if the flow resistance of the outlet arrangement 25 is higher than the flow resistance of the spaces which follow the outlet arrangement downstream in the reactor or evaporator. Beneficially, the flow resistance is at least twice as high, preferably at least three times as high, and particularly preferably at least as high.

It is furthermore particularly advantageous for the device to be used as a plate reactor in a fuel-cell system and as an evaporator in a fuel-cell system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Device for feeding educts to parallel spaces separated from one another comprising a distributor unit, an outlet arrangement of the distributor unit operatively assigned to the parallel spaces, and evaporator structures for the evaporation of liquid media provided in the spaces, wherein the outlet arrangement projects into the spaces, and the distributor unit is configured such that, at each point of the distributor unit, a boiling point of the liquid medium remains above an actual temperature of the medium in the distributor unit.

2. Device for feeding educts to parallel spaces separated from one another comprising a distributor unit, an outlet arrangement of the distributor unit operatively assigned to the parallel spaces, and evaporator structures for the evaporation of liquid media provided in the spaces, wherein the outlet arrangement projects into the spaces, and, at each point of the distributor unit, a boiling point $T_s$ of the liquid medium is above an actual temperature of the medium in the distributor unit, wherein the distributor unit is configured such that flow resistance or pressure loss in the distributor unit varies as a function of a temperature profile along the distributor unit.

3. Device for feeding educts to parallel spaces separated from one another comprising a distributor unit, an outlet arrangement of the distributor unit operatively assigned to the parallel spaces, and evaporator structures for the evaporation of liquid media provided in the spaces, wherein the outlet arrangement projects into the spaces, and, at each point of the distributor unit, a boiling point $T_s$ of the liquid medium is above an actual temperature of the medium in the distributor unit, wherein the distributor unit is configured such that flow resistance or pressure loss therein rises in proportion to the temperature of the distributor unit.

4. Device according to claim 1, wherein at least a last stage of the distributor has a flow resistance sufficiently high that the boiling point of the liquid in the respective outlet arrangement is higher than an ambient temperature of the outlet arrangement in the respective parallel space.

5. Device according to claim 1, wherein the distribution unit is configured such that the boiling point of the medium is highest at the hottest point of the distributor unit.

6. Device according to claim 1, wherein the distributor unit is configured to be thermally uncoupled in relation to the spaces, at least in a region of the outlet arrangement.

7. Device according to claim 1, wherein the distributor unit is configured to be cooled in relation to the spaces.

8. Device according to claim 1, wherein the distributor unit is configured such that the liquid medium is feedable to a plurality of spaces via a common feed unit.

9. Device according to claim 1, wherein the distributor unit comprises at least one distributor stage, via which the liquid medium is distributable into the spaces from a common feed unit.

10. Device according to claim 1, wherein the distributor unit is configured such that the flow resistance of a last stage thereof is higher by at least a factor of three than a flow resistance of the distributor unit upstream of the last stage.

11. Device according to claim 4, wherein the distributor unit is configured such that the flow resistance between different outlets of the last stage deviates by at most almost 20% from an average value of the flow resistance of the outlet arrangement.

12. Device according to claim 4, wherein to generate the higher flow resistance, the distributor unit includes structure effecting a pressure loss, which structures is selected from at least one of capillaries, duct structures, meander structures, and sintered porous materials.

13. Device according to claim 1, wherein the distributor unit is configured such that flow resistance is higher in the outlet means than in downstream spaces of the device.

14. Device according to claim 1, wherein the distributor unit is configured such that thermally insulating structure is arranged at least regionally around the distributor unit.

15. Device according to claim 1, wherein the spaces are formed by at least one tube, with one outlet of the outlet arrangement arranged to project into a respective tube.

16. Method of using the device according to claim 1, comprising arranging the device to act as a plate reactor.

17. Method of using the device according to claim 1, comprising arranging the device to act as an evaporator having a plate-like construction.

18. Method of using the device according to claim 1, comprising operatively arranging the device as part of a fuel-cell system.

* * * * *